3,347,878
SELECTED 17,17-DIFLUORO STEROIDS OF THE
ESTRANE SERIES
George A. Boswell, Wilmington, Del., assignor to E. I.
du Pont de Nemours and Company, Wilmington, Del.,
a corporation of Delaware
No Drawing. Filed Mar. 31, 1965, Ser. No. 444,422
9 Claims. (Cl. 260—397.3)

This invention relates to new fluorine-substituted steroids of the estrane series. More particularly, it relates to new 17,17-difluoroestranes. These new fluorinated steroids are characterized by valuable biological properties, including in particular anti-androgenic activity and antigonadotrophic activity.

The new compounds of this invention are ring-unsaturated, 17,17-difluoro steroids of the estrane series represented by the following formulas:

(1)

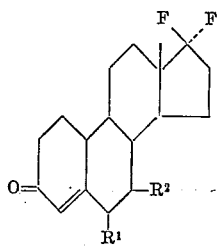

where $R^1$ separately is hydrogen, chlorine or bromine; $R^2$ separately is hydrogen, alkyl or thioacetyl; and $R^1$ and $R^2$ together are an additional bond joining carbon atoms 6 and 7;

(2)

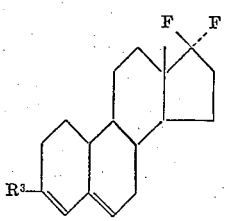

where $R^3$ is O-alkyl, O-acyl, or O-cycloalkyl; and (3)

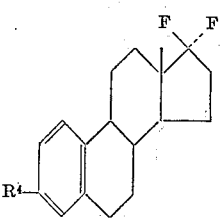

where $R^4$ is hydroxyl, O-alkyl, O-acyl, or O-cycloalkyl.

"Acyl" in each instance above is defined as a lower alkanoyl radical (i.e., of 1–8 carbon atoms), e.g., formyl, acetyl, propionyl, isobutyryl, hexanoyl or octanoyl; "Alkyl" in each instance is a lower alkyl radical (i.e., of 1–8 carbon atoms), e.g., methyl, ethyl, propyl, isopropyl, butyl or n-hexyl, and "cycloalkyl" is a 5 to 6 member cycloalkyl radical, i.e., cyclopentyl or cyclohexyl.

The products of this invention can be prepared by the various methods briefly described below and more fully illustrated in the examples which follow.

Compounds of Formulas 1 and 2 are prepared by methods initially involving the reaction of sulfur tetrafluoride with 4-estrene-3,17-dione. Reactions of this type have been reported in the literature [Tadanier and Cole, J. Org. Chem., 26, 2436 (1961), and U.S. Patent 3,163, 661; Martin and Kagan, J. Org. Chem., 27, 3164 (1962)] and the described methods may be used in the present case. In this reaction the 17-keto group is replaced by two fluorine atoms but the conjugated 3-keto group, which is much less reactive, remains substantially unaffected under mild operating conditions. Through appropriate transformations using known procedures, the resulting 17,17-difluoro-4-estrene-3-one serves as the source of other compounds of Formulas 1 and 2. Thus, it can be converted to 3-acetoxy-17,17-difluoro-3,5-estradiene. This is done, in accordance with the known methods of converting a 3-keto-$\Delta^4$ steroid to the enol acetate, by treatment either with isopropenyl acetate (cf. Djerassi, "Steroid Reactions," 1963, pp. 37–42) or with acetyl chloride and acetic anhydride in pyridine (cf. Bull. Soc. Chim., 1957, 1289). Other 3-acyloxy-17,17-difluoro-3,5-estradienes may be prepared in the same manner, using the appropriate enol acylating agent. Similarly, 3-alkoxy-17,17-difluoro-3,5-estradienes can be prepared from the 3-keto-$\Delta^4$ compound by known methods of enol etherification, e.g., by treatment with an alkyl orthoformate.

Reaction of a 3-acyloxyl-17,17-difluoro-3,5-estradiene with N-bromo- or N-chlorosuccinimide [cf. Tetrahedron 4, 241 (1958)] leads to 6-bromo (or chloro)-17,17-difluoro-4-estrene-3-one. These 6-halo compounds are stable at temperatures of 0° C. or lower but, on standing at room temperature for several hours, they aromatize spontaneously with sumultaneous dehydrohalogenation to give 17,17-difluoro-1,3,5(10) - estratriene-3-ol. However, on treatment with lithium bromide in an alkaline environment, e.g., in the presence of lithium carbonate in a reaction medium such as dimethylformamide, they are dehydrohalogenated without aromatization, thus leading to 17,17-difluoro-4,6-estradiene-3-one.

17,17-difluoro-4-estrene-3-ones having a thioacetyl or alkyl substituent at the 7-position are obtained from 17,17-difluoro-4,6-estradiene-3-one by appropriate reactions. Thus, reaction with thiolacetic acid [cf. J. Org. Chem., 24, 1109 (1959)] gives 17-17-difluoro-7α-thioacetyl-4-estrene-3-one, and reaction with an alkyl magnesium bromide and cuprous chloride [cf. J. Org. Chem. 26, 3077 (1961); J. Am. Chem. Soc., 81, 4069 (1959); Steroids 1, 317 (1963)] leads to a 7α-alkyl-17,17-difluoro-4-estrene-3-one.

Some of the transformations discussed above are represented schematically in Diagram A below.

DIAGRAM A

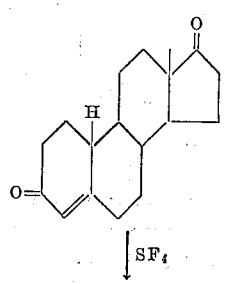

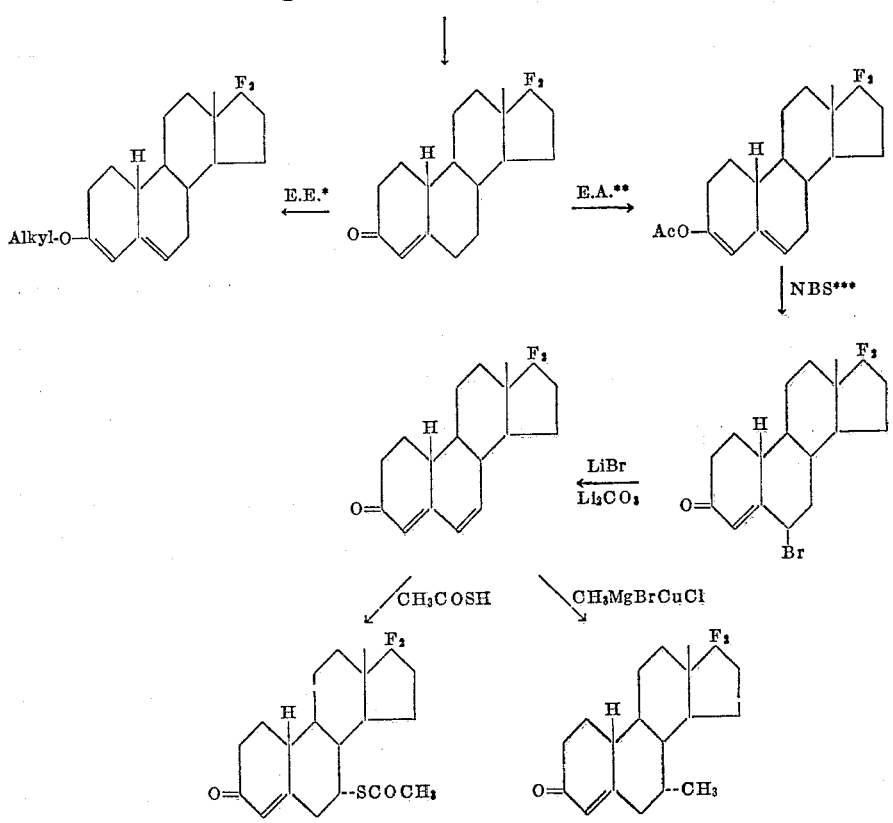

*E.E. = Enol etherification agent, e.g., alkyl orthoformate.
**E.A. = Enol acetylation agent, e.g., isopropenyl acetate.
***NBS = N-bromo (or N-chloro)-succinimide.

The compound of Formula 3 where $R^3$ is OH, i.e., 17,17-difluoro-1,3,5(10)-estratriene-3-ol, may be synthesized according to the recently published steroid aromatization procedure [J. Am. Chem Soc. 86, 742 (1964)] using the radical anion derived from lithium metal and biphenyl in boiling tetrahydrofuran, whereby a $\Delta^{1,4}$-3-keto-androstadiene is converted to a $\Delta^{1,3,5}$-3-hydroxy-estratriene. The reaction sequence is as follows:

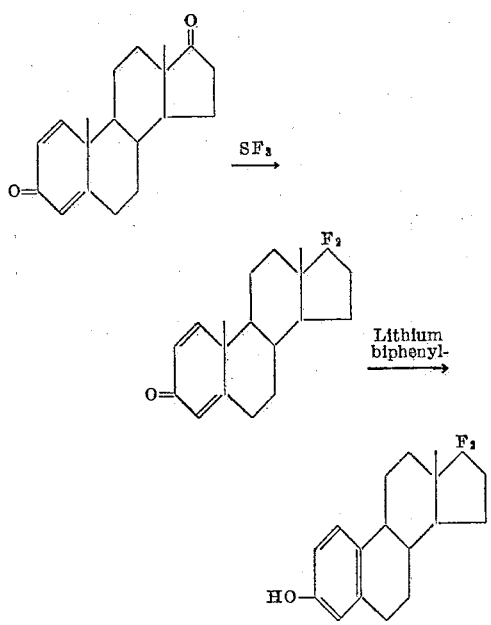

This reaction is preferably carried out in the presence of an acidic hydrocarbon such as diphenylmethane to capture the by-product methyllithium.

17,17-difluoro-1,3,5(10)-estratriene-3-ol can also be prepared, as mentioned above, by the spontaneous aromatization-dehydrohalogenation of 6-bromo (or chloro)-17,17-difluoro-4-estrene-3-one at room temperature. This reaction is accompanied by the unexpected formation in minor amounts of a dehydration compound, di[17,-17-difluoro-1,3,5(10)-estratriene-3-yl] ether.

17,17-difluoro-1,3,5(10)-estratriene-3-ol can be esterified or etherified by standard methods.

This invention is illustrated in greater detail in the following examples. In these examples, unless otherwise stated, the melting points are reported as observed using a Fisher-Johns apparatus and are uncorrected. The optical rotation determinations were made in chloroform (chf.). The values given are followed by the letter c and a number which indicates the concentration (grams of substance per 100 ml. of solvent).

EXAMPLE 1

*17,17-difluoro-4-estrene-3-one*

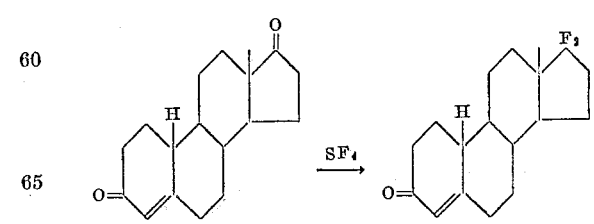

A solution of 4-estrene-3,17-dione (4.7 g.) in methylene chloride (100 ml.) containing suspended water (1.5 ml.) was shaken with sulfur tetrafluoride (150 g.) in a pressure vessel at 20±2° C. for 30 hours. The reaction vessel was vented, swept out with a stream of nitrogen, and the contents were transferred to a separatory funnel. The methylene chloride solution was washed with water, 5% sodium bicarbonate solution, water and saturated salt solution. After drying over magnesium sulfate, the solution was evaporated to dryness under reduced pressure to give 17,17-difluoro-4-estrene-3-one, M.P. 148° C. after crystallization from acetone-hexane, yield 2.24 g. An analytical sample was recrystallized from the same solvent pair to give massive, colorless prisms, M.P. 156–157° C. (capillary tube), [α]$_D^{23}$ +42° (c. 2.15, chf.).

Analysis.—Calc'd for C$_{18}$H$_{24}$F$_2$O: C, 73.4; H, 8.2; F, 12.9. Found: C, 73.63; H, 8.28; F, 12.79.

Infrared: λ$_{max.}^{Nujol}$ 5.98 (C–3 conj. C=O), 6.15 (conj. C=C) and 8.56μ (CF$_2$).

Ultraviolet: λ$_{max.}^{EtOH}$ 237 mμ (ε=17,200) and 285 mμ (ε=244).

EXAMPLE 2

*3-acetoxy-17,17-difluoro-3,5-estradiene*

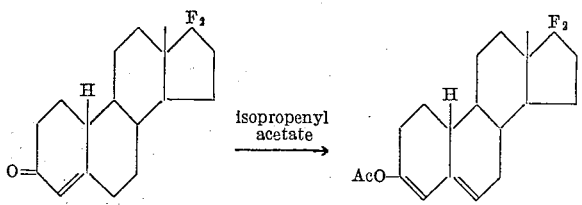

A solution of 17,17-difluoro-4-estrene-3-one (3.3 g.) in freshly distilled isopropenyl acetate (75 ml.) containing p-toluenesulfonic acid (0.5 g.) was heated to reflux for 24 hours and then allowed to cool to room temperature. Excess solid sodium bicarbonate was added with stirring and the mixture was evaporated on a rotary evaporator. The residue was taken up in methylene chloride, the methylene chloride solution was washed with water and saturated salt solution and finally dried over magnesium sulfate. The solvent was removed under reduced pressure and the residue was triturated with methanol to afford 3-acetoxy-17,17-difluoro-3,5-estradiene as a white solid, yield 3.5 g. An analytical sample was recrystallized from acetone to give colorless leaflets, M.P. 151–153° C., [α]$_D^{23}$ −141° (c. 2.31, chf).

Analysis.—Calc'd for C$_{20}$H$_{26}$F$_2$O$_2$: C, 71.2; H, 7.78; F, 11.27. Found: C, 71.53; H, 7.72; F, 11.26.

Infrared: λ$_{max.}^{Nujol}$ 5.70 (AcO), 6.01, 6.12 (C=C), 8.2 (AcO) and 8.55 mμ (CF$_2$)

Ultraviolet: λ$_{max.}^{EtOH}$ 235 mμ (ε=19,500).

EXAMPLE 3

The compound of Example 2 was prepared by a different method, using a mixture of acetic anhydride and acetyl chloride as the enol acylating agent.

A solution of 17,17-difluoro-4-estrene-3-one (18.3 g.), pyridine (14.6 ml.), redistilled acetic anhydride (366 ml.) and acetyl chloride (146.5 ml.) was heated to reflux for 2 hours under nitrogen, after which the mixture was cooled in an ice bath, causing the reaction product to precipitate. The colorless solid was collected by filtration, washed well with cold methanol and air-dried. The filtrate was concentrated under reduced pressure and the residue was triturated with methanol to give a crystalline solid which was collected by filtration, washed with cold methanol and air-dried. The combined solids were recrystallized from acetone to give 3-acetoxy-17,17-difluoro-3,5-estradiene (16.8 g.) as white plates, M.P. 152–154° C. The infrared spectrum was identical to that of the product of Example 2.

Other 3-acyloxy steroids of the same structure, for example, the 17,17-difluoro-3,5-estradienes in which the 3-carbon bears a propionyloxy, butyryloxy, isobutyryloxy, n-pentanoyloxy or n-hexanoyloxy substituent, can be prepared by the same procedure, using the requisite carboxylic acid anhydride.

EXAMPLE 4

*3-ethoxy-17,17-difluoro-3,5-estradiene*

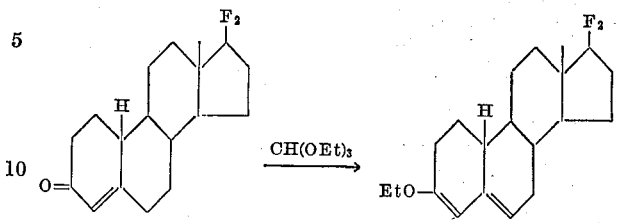

A suspension of 17,17-difluoro-4-estrene-3-one (2.84 g.) in dry dioxane containing redistilled ethyl orthoformate (7.0 ml.) and p-toluenesulfonic acid (0.2 g.) was stirred for 3 hours at room temperature. To the resulting clear yellow solution was added pyridine (5 ml.), followed by dropwise addition of water with stirring. The precipitate of 3-ethoxy-17,17-difluoro-3,5-estradiene was collected by filtration, washed with water and air-dried, yield 3.14 g. This was recrystallized from methanol containing a few drops of pyridine and water, and the product (M.P. 151–156° C.) was again recrystallized from ether to give glistening yellow plates, M.P. 155–159° C. (capillary tube), [α]$_D^{23}$ −84° (c. 2.20, chf.).

Analysis.—Calc'd for C$_{20}$H$_{28}$F$_2$O: C, 75.0; H, 8.77; F, 11.75. Found: C, 77.84; H, 8.85; F, 11.69.

Infrared: λ$_{max.}^{Nujol}$ 6.05, 6.15 (C=C) and 8.56μ (CF$_2$)

Ultraviolet: λ$_{max.}^{EtOH}$ 242 mμ (ε=19,600)

Other 3-alkyloxy steroids of the same structure, for example, the 17,17-difluoro-3,5-estradienes having a methoxy, propoxy, isopropoxy, butoxy or cyclohexyloxy group on the 3-carbon atom, can be prepared by the same procedure, using the appropriate alkyl orthoformate, or by an exchange reaction with a different alcohol.

EXAMPLE 5

*17,17-difluoro-1,3,5(10)-estradiene-3-ol*

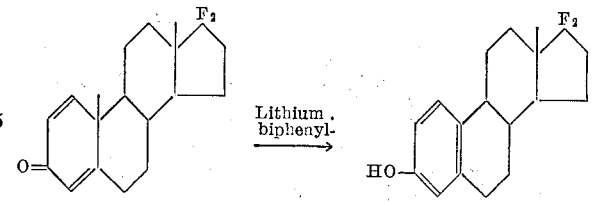

The starting material in this example, 17,17-difluoro-1,4-androstadiene-3-one, may be prepared as described by Tadanier and Cole, J. Org. Chem. 26, 2436 (1961).

A solution of 17,17-difluoro-1,4-androstadiene-3-one (2.34 g.) in dry tetrahydrofuran (50 ml.) and a solution of diphenylmethane (12.79 g.) in dry tetrahydrofuran (50 ml.) were added from separate dropping funnels at the same rate to a stirred solution of the radical-anion prepared by heating lithium metal (0.525 g., 75.5 mmoles), biphenyl (11.6 g., 75.5 mmoles) and dry tetrahydrofuran (100 ml.) to reflux under nitrogen until most of the metal had dissolved. The addition was completed in 30 minutes with the temperature being maintained around 40° C. Stirring of the deep blue solution was continued 3 hours, after which time the solution was poured into cold 5% hydrochloric acid, which discharged the blue color. The resulting mixture was extracted with ether and the extracts were washed with water, 5% sodium hydroxide solution (no estratrienol was extracted by this treatment), water and saturated salt solution. After drying over magnesium sulfate, the solvent was evaporated under reduced pressure, leaving a thick colorless syrup mixed with solid which was dissolved in hexane and chromatographed on a column of a commercial chromatography adsorbent ("Florisil," 100 g.). Elution with hexane (five 200 ml. fractions) returned a mixture of biphenyl and diphenylmethane. Elution with hexane-ether (4:1) returned in the first 200 ml. fraction a white solid whose infrared spectrum indicated it to be the desired 17,17-difluoro-1,3,5(10)-estradiene-3-ol. After recrystallization from hexane-acetone, the product was obtained as colorless leaflets, M.P. 160° C., yield 1.15 g. A portion was further purified by a second recrystallization from the same solvent pair, giving white needles, M.P. 167–167.5° C. (capillary tube), $[\alpha]_D^{24}$ +66° (c. 2.50, chf.). The analytical sample was sublimed.

*Analysis.*—Calc'd for $C_{18}H_{22}F_2O$: C, 73.8; H, 7.54; F, 12.9. Found: C, 74.02; H, 7.53; F, 12.99.

Infrared: $\lambda_{max.}^{Nujol}$ 3.05 (C–3 OH), 6.16 and 6.27 (aromatic, strong sharp doublet), 6.65 (aromatic, strong), 8.56 and 8.63μ ($CF_2$, strong doublet)

Ultraviolet: $\lambda_{max.}^{EtOH}$ 281 mμ ($\epsilon$ =2120)

17,17 - difluoro - 1,3,5(10) - estradiene-3-ol can be esterified according to any of the known procedures to give 17,17-difluoro-1,3,5(10)-estratrienes in which the 3-carbon bears, for example, the acetoxy, propionoxy, butyroxy or hexanoyloxy group. Similarly, it can be etherified, for example, by treatment with an appropriate dialkyl sulfate, to give 17,17-difluoro-1,3,5(10)-estratrienes in which the 3-carbon bears, for example, the methoxy, ethoxy, butoxy, n-hexyloxy or cyclopentyloxy group.

EXAMPLE 6

The product of Example 5 was prepared by a different method, in accordance with the following reaction sequence:

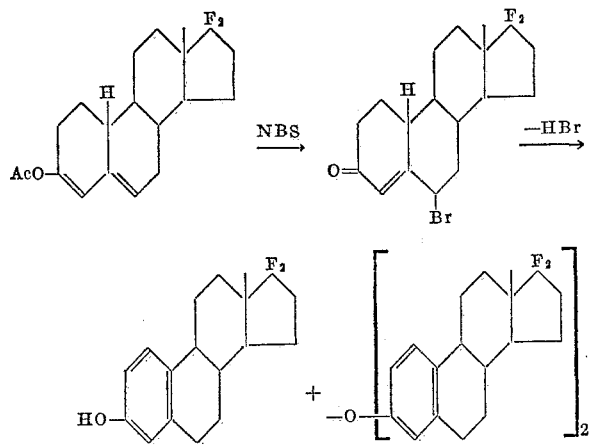

(A) To a stirred solution, cooled to 0° C., of 3-acetoxy-17,17-difluoro-3,5-estradiene (16.8 g.) in acetone (675 ml.) containing sodium acetate (12.35 g.) and water (84 ml.), there was added in one portion solid N-bromosuccinimide (17.97 g.), followed immediately with glacial acetic acid (14 ml.). The resultant mixture was stirred for 3 hours at 0–5° C., then poured into ice water. The precipitate of 6-bromo-17,17-difluoro-4-estrene-3-one was collected by filtration, washed well with water and air-dried, yield 18.2 g.

(B) Without further purification, the major portion of the above product (17.24 g.) was subjected to dehydrobromination by maintaining it under a pressure of about 0.1 mm. at room temperature for about 18 hours. The weight loss during this time was 2.7 g., and the infrared spectrum of the product showed that a good conversion to 17,17-difluoro-1,3,5(10)-estratriene-3-ol had taken place. In order to insure complete dehydrobromination, this product was dissolved in methylene chloride (50 ml.) and this solution was added dropwise to a mixture of dry dimethylformamide (300 ml.), lithium bromide (14 g.) and lithium carbonate (14 g.) at 100° C. under nitrogen, allowing the methylene chloride to boil off. The resultant mixture was stirred at 100° C. for 3.5 hours, then cooled and poured into water. The aqueous mixture was extracted with methylene chloride, the extracts were washed with water and saturated salt solution, dried over magnesium sulfate, and finally evaporated to dryness under reduced pressure. The residual semi-crystalline product was dissolved in hexane containing a little acetone and this solution was adsorbed onto a column (400 g.) of commercial chromatography adsorbent ("Florisil"). Elution with hexane (five 250 ml. fractions) and hexane containing 2% of acetone (four 250 ml. fractions) returned a product (1.1 g.) which was shown by elemental and spectral analyses to be di-[17,17-difluoro-1,3,5(10)-estratriene-3-yl] ether. After recrystallization from acetone-hexane, this ether was obtained (yield 0.757 g.) as colorless needles, M.P. 224–226° C. (capillary tube), $[\alpha]_D^{23}$ +64° (c. 2.05, chf.).

*Analysis.*—Calc'd for $C_{36}H_{42}F_4O$: C, 76.5; H, 7.48; F, 13.4. Found: C, 76.49; H, 7.53; F, 13.34.

Infrared: $\lambda_{max.}^{Nujol}$ 6.26, 6.37 and 6.72 (aromatic C=C) and 8.62μ ($CF_2$).

Ultraviolet: $\lambda_{max.}^{EtOH}$ 288 ($\epsilon$ =2570), 278 ($\epsilon$ =2960) and 272 mμ ($\epsilon$=2760).

Continued elution of the column with hexane containing 5% of acetone (ten 250 ml. fractions) returned 17,17-difluoro-1,3,5(10)-estratriene-3-ol (9.5 g.) as a colorless solid which, after recrystallization from hexane, melted at 163–165° C. The infrared spectrum was identical to that of the product of Example 5.

EXAMPLE 7

*17,17-difluoro-4,6-estradiene-3-one*

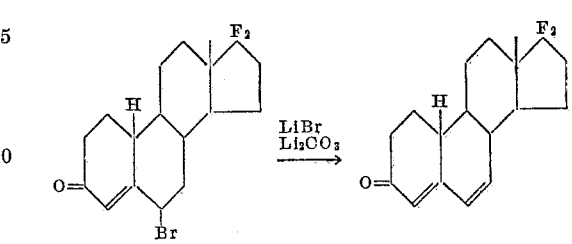

6-bromo-17,17-difluoro-4-estrene-3-one was prepared as described in Example 6–A. Immediately after its preparation, i.e., before spontaneous aromatization at room temperature took place to any appreciable extent, this compound (13.2 g.) was dissolved in methylene chloride and the solution was added dropwise to a stirred mixture of lithium bromide (13 g.), lithium carbonate (13 g.) and dry dimethylformamide at 100° C., allowing the methylene chloride to boil off. After stirring for 3.5 hours at 100° C., the mixture was cooled and poured into water. The aqueous mixture was extracted with methylene chloride, the methylene chloride extracts were washed with water and saturated salt solution, dried over magnesium sulfate and evaporated under reduced pressure. The solid residue was taken up in acetone, this solution was diluted several-fold with hexane and the resultant solution was adsorbed onto a column (400 g.) of commercial chromatography adsorbent ("Florisil"). Elution with hexane containing increasing amounts of acetone (from 1 to 7.5%) returned 17,17-difluoro-4,6-estradiene-3-one as a crystalline product which was recrystallized from acetone-hexane to give nearly colorless needles, yield 6.59 g., M.P. 135–138° C., $[\alpha]_D^{23}$ +7° (c. 2.02, chf.). The analytical sample was sublimed.

*Analysis.*—Calc'd for $C_{18}H_{22}F_2O$: C, 73.8; H, 7.54; F, 12.9. Found: C, 73.72; H, 7.50; F, 12.89.

Infrared: $\lambda_{max.}^{Nujol}$ 6.02 (conj. C–3 C=O), 6.19 (C=C)' 6.31 (C=C), and 8.56μ ($CF_2$).

Ultraviolet; $\lambda_{max.}^{EtOH}$ 282 mμ ($\epsilon$ = 25,600).

EXAMPLE 8

17,17-difluoro-7α-methyl-4-estrene-3-one

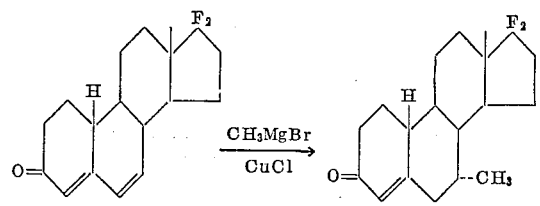

To a stirred solution, cooled in an ice bath, of 17,17-difluoro-4,6-estradiene-3-one (6.5 g.) in dry tetrahydrofuran (75 ml.) containing in suspension thoroughly powdered cuprous chloride (212 mg.), there was added under nitrogen over a period of 4 minutes one-half the volume of a freshly prepared mixture of commercial 3M methyl magnesium bromide solution (35.4 ml.), dry tetrahydrofuran (260 ml.) and cuprous chloride (850 mg.). After an additional 4 minutes of vigorous stirring, the reaction mixture was poured into ice containing concentrated hydrochloric acid (30 ml.). The product was isolated by extraction with methylene chloride. The extracts were washed with water, 5% sodium bicarbonate solution, water and saturated salt solution. Removal of the solvent under reduced pressure left a crystalline residue which was dissolved in benzene-hexane (1:2). The solution was adsorbed on a column of neutral alumina (175 g., activity III). Elution with hexane and hexane-benzene (3:1) returned a colorless crystalline product. The infrared spectrum showed complete loss of the dienone system with the enone system remaining. The solid fractions were combined and recrystallized from acetone-hexane to give a head crop of 3.24 g. and a second crop of 1.02 g. These were combined and recrystallized from acetone-hexane-petroleum ether to give pure 17,17-difluoro-7α-methyl-4-estrene-3-one (3.2 g.) as large colorless prisms, M.P. 124–127° C. (capillary tube), $[\alpha]_D^{23}$ +42° (c. 2.14 chf.).

*Analysis.*—Calc'd for $C_{19}H_{26}F_2O$: C, 74.1; H, 8.48; F, 12.32. Found: C, 73.96; H, 8.87; F, 12.26.

Infrared: $\lambda_{max.}^{Nujol}$ 5.99 (C–3 conj. C=O), 6.17 (C=C), and 8.56μ (CF₂)

Ultraviolet: $\lambda_{max.}^{EtOH}$ 238 (ε=17,500) and 312 mμ (ε=76)

EXAMPLE 9

17,17-difluoro-7α-thioacetyl-4-estrene-3-one

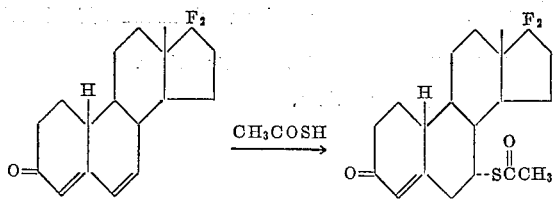

A solution of 17,17-difluoro-4,6-estradiene-3-one (0.5 g.) in redistilled thiolacetic acid (30 ml.) was heated to reflux for 30 hours. The solvent was evaporated under reduced pressure, leaving a dark syrup which was recrystallized from acetone-hexane to give 17,17-difluoro-7α-thioacetyl-4-estrene-3-one (0.2 g.) as white needles, M.P. 178–180° C. (capillary tube) $[\alpha]_D^{24}$ −106° (c. 2.18 chf.).

*Analysis.*—Calc'd for $C_{20}H_{26}F_2O_2S$: C, 65.19; H, 7.11; F, 10.31. Found: C, 65.06; H, 7.10; F, 10.25.

Infrared: $\lambda_{max.}^{Nujol}$ 5.92 (ester C=O), 5.99 (C–3 conj. C=O), 6.17 (C=C) and 8.55μ (CF₂)

Ultraviolet: $\lambda_{max.}^{EtOH}$ 310 (ε=87) and 237 mμ (ε=20,400)

EXAMPLE 10

3-cyclopentoxy-17,17-difluoro-3,5-estradiene

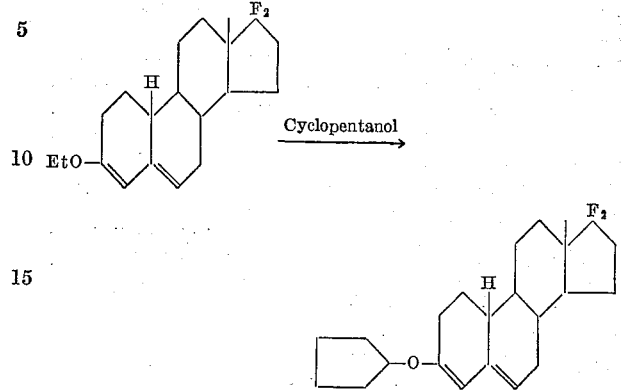

A mixture of 3-ethoxy-17,17-difluoro-3,5-estradiene (3.34 g.), cyclopentanol (10 ml.), p-toluenesulfonic acid (100 mg.) and dry benzene (400 ml.) was heated to reflux for one hour while allowing about 50 ml. of liquid to distill off slowly. The residual yellow solution was cooled to room temperature and 10 ml. of pyridine was added with stirring. The solution was then evaporated under reduced pressure to leave a viscous oil which crystallized when triturated with a mixture of ether and methanol. The solid was collected by filtration, washed with cold methanol containing a few drops of pyridine and air-dried, yield 4.23 g., M.P. 78–80° C. This product was recrystallized from methanol containing a little pyridine to give 3-cyclopentoxy-17,17-difluoro-3,5-estradiene as colorless needles, M.P. 90–90° C. (first crop, 3.2 g.)

*Analysis.*—Calc'd for $C_{23}H_{32}F_2O$: C, 76.0; H, 9.15; F, 10.4. Found: C, 76.30; H, 8.68; F, 10.12.

Infrared: $\lambda_{max.}^{Nujol}$ 6.09, 6.19 (C=C) and 8.55μ (CF₂)

Ultraviolet: $\lambda_{max.}^{EtOH}$ 245 mμ (ε=20,800)

The 17,17-difluoro steroids of this invention in which the A ring is not aromatized have all shown anti-androgenic activity, as demonstrated by tests on male rats, with some being more effective than others in this respect. Anti-androgenic activity is shown by the fact that these compounds are able to inhibit the hormonal action of simultaneously administered testosterone propionate in castrate male rats, and to inhibit endogenous androgen (mainly testosterone) in intact male rats. Furthermore, the tests indicate that these compounds block the androgenic (virilizing) action of testosterone without blocking the anabolic (myotrophic) action, and in fact exhibit a slight anabolic effect. The degree of androgen inhibition is determined by measuring the ability of the compound to block the testosterone propionate-induced hypertrophy of the ventral prostate, seminal vesicle and preputial gland in the castrate male rat and to inhibit the normal growth of these glands in the immature intact male rat. The degree of anabolic effect is estimated on the basis of the gain in weight of the body and levator ani muscle.

As is known, anti-androgenic steroids are valuable agents in the therapeutic treatment of prostatic carcinoma in male mammals [see, for example, the article by Huggins in Cancer Research, 16, 825 (1956)] and have been proposed in the treatment of other disorders such as post-puberal and idiopathic hirsutism female mammals, and the Stein-Leventhal syndrome [see, for example, Saunders et al., Steroids, 3, 687 (1964), listing leading references].

It was quite unexpected to find that the compounds of this invention possess anti-androgenic activity since certain previously known 17,17-difluoro steroids are reported to be androgenic, i.e., to possess the opposite activity.

Additionally, most of the compounds of this invention, in particular those having an alkyl or thioacetyl substituent at the 7-position, also possess other highly valuable therapeutic properties. Thus, they exhibit anti-gonadotrophic action, i.e., they inhibit pituitary secretions. This property indicates usefulness in the treatment of disorders, apparently connected with excessive gonadotrophin secretion, which often occur during menopause. Furthermore, they show potent anti-fertility properties in test animals, a finding which was unexpected since the related, previously known 17,17-difluoro-4-androstene-3-one does not show this effect. For example, 17,17-difluoro-7α-methyl-4-estrene-3-one effectively prevents implantation and ovulation in the female rat when administered either by the oral or subcutaneous route.

17,17-difluoro-1,3,5(10)-estratriene-3-ol shows little or no anti-androgenic activity but it has other valuable properties. Thus, it is a potent anti-gonadotrophin and effectively blocks implantation in the female rat. At the same time, it has a very low estrogenic effect, possessing less than 1% of the uterotrophic activity of estrone, as shown by tests on castrate female mice.

As many apparently widely different embodiments of this invention may be made without departing from the spirit and scope thereof, it is to be understood that this invention is not limited to the specific embodiments described herein.

The embodiments of the invention in which an exclusive property or privilege is claimed are defined as follows:

1. A steroid selected from the class consisting of (1)

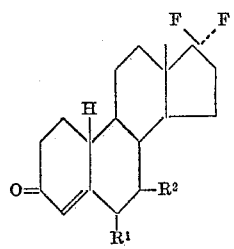

wherein R¹ is selected from the group consisting of hydrogen, chlorine and bromine; R² is selected from the group consisting of hydrogen, lower alkyl and thioacetyl; and R¹ and R² together can be an additional bond between carbon atoms 6 and 7 of the steroid nucleus;

(2)

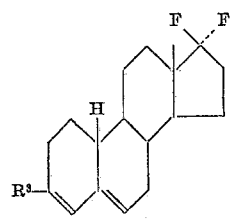

wherein R³ is selected from the group consisting of O-lower alkyl, O-cycloalkyl of 5–6 carbon atoms and O-lower alkanoyl; and (3)

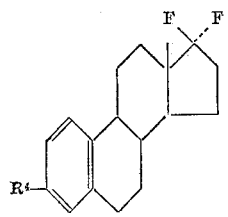

wherein R⁴ is selected from the group consisting of hydroxyl, O-lower alkyl, O-cycloalkyl of 5–6 carbon atoms, and O-lower alkanoyl.

2. 17,17-difluoro-4-estrene-3-one.
3. 3-acetoxy-17,17-difluoro-3,5-estradiene.
4. 17,17-difluoro-4,6-estradiene-3-one.
5. 17,17-difluoro-7α-methyl-4-estrene-3-one.
6. 17,17-difluoro-7α-thioacetyl-4-estrene-3-one.
7. 17,17-difluoro-1,3,5(10)-estratriene-3-ol.
8. A steroid of claim 1 having the formula

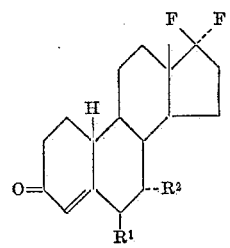

wherein R¹ and R² are defined as in claim 1.

9. A steroid of claim 1 having the formula

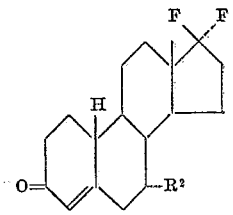

wherein R² is selected from the group consisting of hydrogen, lower alkyl and thioacetyl.

References Cited

UNITED STATES PATENTS 3,163,661   12/1964   Tadanier et al. _____ 260—397.3

ELBERT L. ROBERTS, *Primary Examiner.*

LEWIS GOTTS, *Examiner.*

UNITED STATES PATENT OFFICE

CERTIFICATE OF CORRECTION

Patent No. 3,347,878

October 17, 1967

George A. Boswell

It is hereby certified that error appears in the above numbered patent requiring correction and that the said Letters Patent should read as corrected below.

Column 1, lines 19 to 29 and column 11, lines 30 to 39, for that portion of each formula reading $-R^2$ read $----R^2$ Signed and sealed this 3rd day of December 1968.

(SEAL)
Attest:

Edward M. Fletcher, Jr.
Attesting Officer

EDWARD J. BRENNER
Commissioner of Patents